April 26, 1932. E. V. J. TOWER 1,855,533
TRANSMITTING MEMBER FOR FRICTION CLUTCHES
Original Filed Feb. 11, 1927
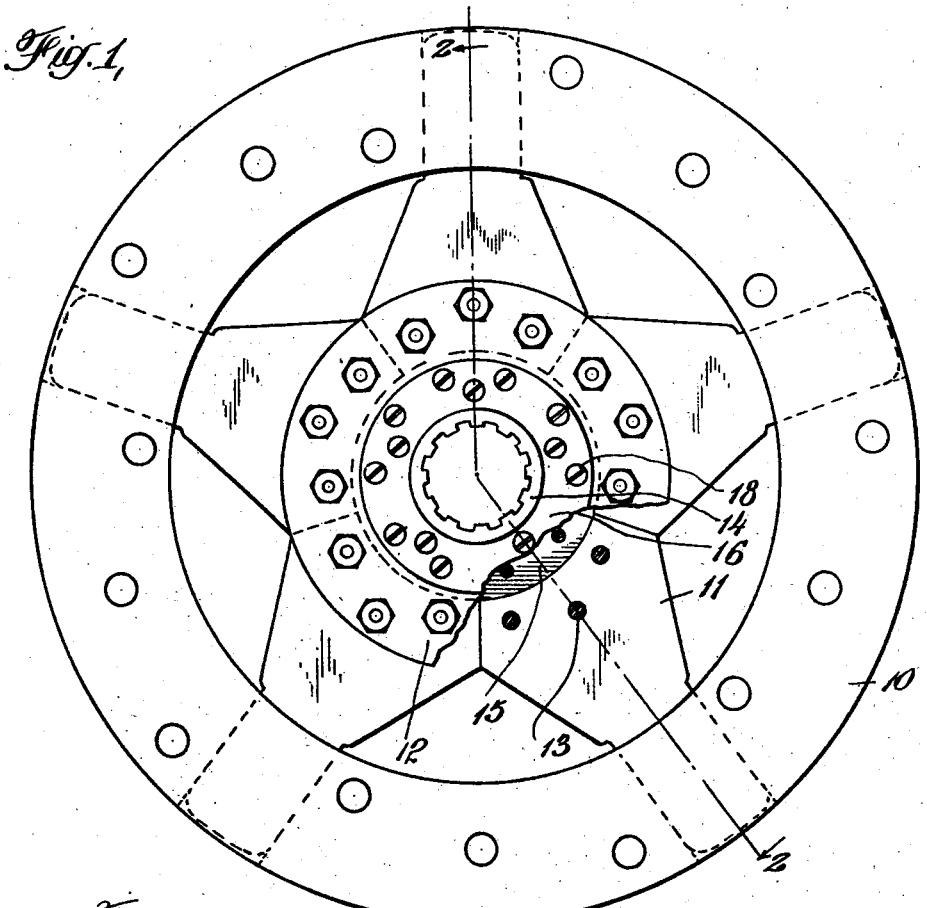
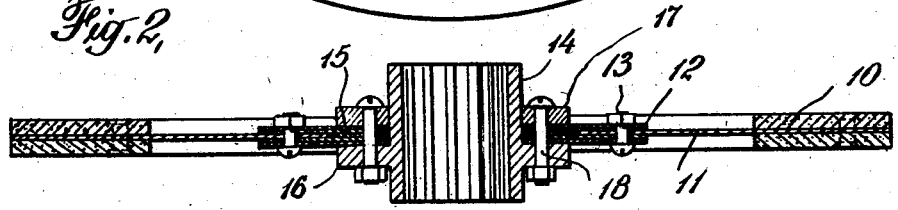
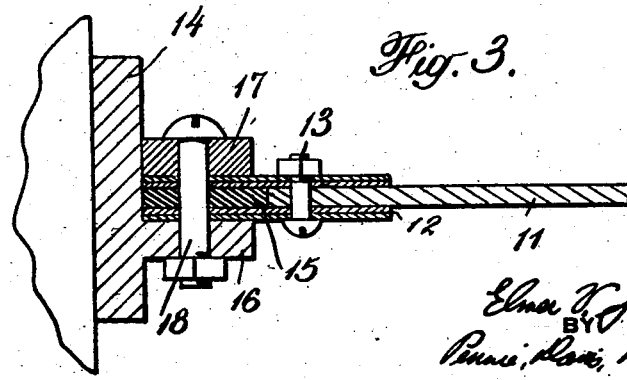
INVENTOR
Elmer V. J. Tower
BY
ATTORNEYS Patented Apr. 26, 1932

1,855,533

UNITED STATES PATENT OFFICE

ELMER V. J. TOWER, OF NORTH SYRACUSE, NEW YORK, ASSIGNOR TO RUSSELL MANUFACTURING COMPANY, OF MIDDLETOWN, CONNECTICUT, A CORPORATION OF CONNECTICUT

TRANSMITTING MEMBER FOR FRICTION CLUTCHES

Original application filed February 11, 1927, Serial No. 167,407. Divided and this application filed January 13, 1930. Serial No. 420,473.

This invention relates to transmitting members for effecting the frictional connection between the driving and driven members of friction clutches of the type used in automobiles or other motor driven vehicles, and this application is a division of my copending application Serial No. 167,407, filed February 11, 1927, and entitled "Friction clutch."

In friction clutches as commonly constructed for automobile installation, the fly-wheel of the motor is used as the driving member and is suitably formed with one or more working surfaces adapted to be engaged by a friction transmitting member mounted upon the transmission shaft, which receives power when this member is forced into engagement with the working surface or surfaces of the fly-wheel. The friction transmitting member ordinarily consists of one or more rigid or semi-rigid discs carrying a strip or ring of friction material which is forced into tight contact with the surface of the fly-wheel by means of a spring-actuated presser-plate controlled by the driver's foot pedal or the like.

Inasmuch as automobile clutches are operated under especially severe conditions due to the loads which they must transmit and also because of the incessant shocks and jars to which they are subjected in use, they must be of strong construction so that they will operate satisfactorily without slipping or seizing, and can be used for long periods without requiring repair or replacement of parts. This construction of the clutch parts gives them considerable inertia in starting and stopping, which, if not properly absorbed, causes heavy shocks and chattering, with eventual damage to the clutch parts, as well as discomfort to the occupants of the vehicle. Also, considerable heat is generated in the clutch due to slipping, and if this heat is not dissipated, damage may be done to the clutch.

The principal object of this invention is to provide a transmitting member for friction clutches which acts to absorb shocks and jars so that smooth and uniform operation is obtained, and excessive strain on the engine, and the transmission shaft and its associated parts, is eliminated.

A further object of this invention is to provide a flexible transmitting member which will conform to irregularities in the surface of the engaging parts of the clutch and thus compensate for any loss in frictional area which may be occasioned by such irregularities, and also permit manufacture of the engaging parts without especial accuracy, because the member will conform to any irregularity.

These and other objects of this invention are obtained in a preferred embodiment thereof, which consists of a flexible disc structure or spider interposed between the hub upon which the member is adapted to be mounted and the friction ring which engages the driving surfaces of the clutch. This spider is flexible at an angle to the plane of rotation of the transmitting member of which it is a part, but is rigid in this plane of rotation. The new spider comprises sheet metal spokes whose hub ends lie in mutual engagement so as to encircle the hub, and whose outer ends carry the friction ring. Connecting the hub ends of the spokes to the hub are flexible sheet metal rings or discs, which provide another point of flexibility, and between the hub and the hub ends of the spokes is interposed a mass of non-metallic material which is a heat insulator for the purpose of arresting the conduction of heat from the friction ring and spokes to the transmission shaft. The spokes to which the frictional heat is confined are spaced apart so that free circulation of air is permitted, and the frictional heat is thus dissipated.

For a better understanding of this invention, reference is made to the accompanying drawings, in which Figure 1 is a face view of the friction transmitting member of this invention;

Fig. 2 is a transverse section taken thereof along the line 2—2 of Fig. 1; and

Fig. 3 is an enlarged portion of the section of Fig. 2 illustrating the arrangement of the parts at the hub in greater detail.

In these drawings, numeral 10 designates the friction ring, which may be formed of any suitable material such as fibre, webbing, or the like, and which is mounted upon the ends of spokes 11, which are of sheet metal and are light and flexible. The hub ends of the spokes are formed so as to make a complete circle when they are assembled, and thereby each spoke supports and is supported laterally by the next adjacent spokes. The hub ends of the spokes 11 are clamped between flexible washers 12 by means of bolts 13 or rivets. Between the hub ends of the spokes and the hub 14 and also clamped between washers 12, is placed a heat insulating washer 15 of asbestos, fibre, or the like. A flange 16 is provided upon hub 14 between which and a separate collar 17 is clamped this assembly of washers 12 and insulating washer 15 by means of bolts 18 or rivets. It will be noted that the disc structure made up in this instance of separate spokes is attached to the washers 12 by rivets or bolts 13 which do not engage the hub, and the washers 12 are connected to the hub by entirely separate connecting means in the form of rivets or bolts 18. The hub 14 is provided, as shown with splines by which it is operatively connected to the driven shaft in the usual manner.

By this arrangement, hub 14 may be made light and strong, the necessary strength being supplied by flange 16 and collar 17, while the arrangement of the flexible washers 12 and insulating washer 15 provides one point of flexibility, and the arrangement of flexible washers 12 and a disc structure 11 provides another point of flexibility, while further flexibility is secured due to the light construction of the spokes 11. Spokes 11 are interchangeable and are shaped so that they may be reversely cut from a sheet of stock without waste. This flexible spider connection between the rigidly mounted hub 14 and the friction ring 11 also compensates for irregularities between the friction surfaces of the clutch by bending slightly where necessary.

The ring 15, being of heat-insulating material, protects the hub against heat developed at the friction surface and transmitted through the spokes. It also serves to centralize the spokes with reference to the hub, simplifying assembling operations by acting as a template against which the hub ends of the spokes may be placed without further alignment since the edges thereof engage each other to form a complete ring encircling the insulating ring.

It will be noted that the spokes are of increasing width as the hub end is approached and this arrangement provides greater heat radiating surface. In addition, at the hub end each spoke is braced against the adjacent spoke and in firm contact with ring 15, so that a strong construction is obtained and strains are transmitted evenly. The openings between adjacent spokes permit air circulation which assists in the dissipation of the heat, and as the spokes are flexible, and flexibly mounted on the hub, vibration is absorbed, the clutch operates smoothly and noise is largely eliminated.

The new friction member is of low manufacturing cost and light in weight, and yet it has strength sufficient to stand the strains and loads to which it is subjected in use. The use of a friction member made up of a relatively light hub and light sheet metal spokes carrying the friction ring secures the maximum flexibility at very low cost, all of the parts used being capable of quantity production at low cost. These parts can be assembled into a unit by labor not highly skilled as no fine adjustments of the parts are required. Due to the unusual flexibility afforded by the new member, vibration is dampened and permanent distortion which so frequently occurs in ordinary clutches, requiring replacement of parts, is virtually eliminated.

The new transmitting member of this invention is adapted to be used in the manner illustrated and described in greater detail in my aforementioned copending application, of which this application is a division, but its field of use is not limited thereby, nor is its construction limited by that illustrated and described herein, but is susceptible of many changes in form and detail within the scope of this invention.

I claim:

1. A transmitting member for friction clutches, comprising a friction ring, a plurality of individual spokes attached thereto, a hub, and a flexible connection between the spokes and the hub.

2. A transmitting member for friction clutches, comprising a ring of friction material, a hub adapted to be mounted on a shaft, individual, substantially radial flexible spokes extending from said ring toward the hub, and a pair of rings connected to the hub and to the hub ends of the spokes, said rings engaging opposite faces of said spokes.

3. A transmitting member for friction clutches, comprising a ring of friction material, a hub adapted to be mounted on a shaft, flexible members mounted in the hub, and spokes connecting the ring with the members.

4. A transmitting member for friction clutches, comprising a ring of friction material, a hub adapted to be mounted on a shaft, flexible spokes attached to the ring, and flexible connecting members joining the spokes to the hub.

5. A transmitting member for friction clutches, comprising a ring of friction material, a hub adapted to be mounted on a shaft, a plurality of independent spokes attached to the ring, and non-rigid connections between the spokes and the hub.

6. A transmitting member for friction clutches, comprising a ring of friction material, a hub adapted to be mounted on a shaft, spokes connected to the ring and secured to the hub, and a non-metallic member interposed between the hub and the hub ends of the spokes.

7. A transmitting member for friction clutches, comprising a ring of friction material, a hub adapted to be mounted on a shaft, individual, substantially radial spokes connected to the ring, the hub ends of said spokes being shaped so as to jointly encircle the hub, and means connecting the hub ends of the spokes to the hub, said means engaging opposite faces of said spokes and maintaining the hub ends of said spokes in a plane.

8. A transmitting member for friction clutches, comprising a ring of friction material, a hub adapted to be mounted on a shaft, spokes connected to the ring, the hub ends of said spokes being formed so that they together encircle the hub, and are spaced therefrom, and yieldable material disposed in the space between the hub ends of the spokes and the hub.

9. A transmitting member for friction clutches, comprising a ring of friction material, a hub adapted to be mounted on a shaft, spokes connected to the ring, the hub ends of said spokes encircling the hub and being spaced therefrom means connecting the hub ends of the spokes to the hub, and yieldable material disposed between the hub ends of the spokes and the hub, the said material being held in place by the said means.

10. A transmitting member for friction clutches, comprising a friction ring, a hub adapted to be mounted on a shaft, flexible spokes connected to the ring, washers mounting the spokes to the hub, and yieldable material held in place by the washers and separating the hub ends of the spokes from the hub.

11. A transmitting member for friction clutches, comprising a friction ring, a hub adapted to be mounted on a shaft, spokes connected to the ring, flexible washers mounting the spokes on the hub, and yieldable material enclosed by the washers and separating the hub ends of the spokes from the hub.

12. A transmitting member for friction clutches, comprising a friction ring, a hub adapted to be mounted on a shaft, flexible spokes connected to the ring, flexible washers mounting the spokes on the hub, and yieldable material enclosed by the washers so as to separate the hub ends of the spokes from the hub.

13. A transmitting member for friction clutches, comprising a friction element, a hub, a plurality of independent, substantially radial, flexible spokes connected in a common plane for securing the element to the hub, and a pair of rings engaging opposite faces of said spokes at their hub ends, said rings being connected to the spokes and the hub and maintaining the spokes in said plane.

14. In a transmitting member for friction clutches, a mounting therefor comprising a plurality of independent, substantially radial, members flexible in a direction at an angle to the surface of the transmitting member, a hub, and connections between the members and the hub in a common plane, the inner ends of said members being spaced a substantial distance from the surface of the hub.

15. In a transmitting member for friction clutches a hub, and means for mounting the member on the hub comprising a plurality of independent, substantially radial, members flexible about an axis parallel to the plane of the transmitting member, said members terminating a substantial distance from said hub, and flexible means overlapping said members and a portion of said hub and connected to the members and to the hub.

16. A transmitting member for friction clutches, comprising a friction ring, a hub having a circumferential flange, a plurality of individual, substantially radial spokes secured to the ring, the opposite ends of the spokes co-acting to form a substantially continuous ring encircling the hub, the hub ends of the spokes terminating outside of the outer surface of said flange, and means for connecting said spoke ends to the flange.

17. A transmitting member for friction clutches, comprising a friction ring, a hub, a plurality of independent spokes extending between the hub and the ring, and flexible means at the hub for securing the spokes thereto, this means being arranged to absorb vibration.

18. A transmitting member for friction clutches, comprising a friction ring, a hub having an integral flange, a plurality of independent spokes connected to the hub and providing a mounting for the ring, and a collar on the hub connected to the spokes and to the flange.

19. A transmitting member for friction clutches, comprising a friction ring, a hub, a plurality of spokes connected to the hub and the ring, and heat-insulating means disposed between the hub ends of the spokes and the hub.

20. A transmitting member for friction clutches, comprising a friction ring, a hub, a plurality of independent substantially radial spokes connecting the hub and the ring, the sides of the hub end of each spoke being in contact with the sides of the hub end of an adjacent spoke and the inner ends of the spokes being spaced a substantial distance from said hub, and means for connecting the spokes to the hub.

21. A transmitting member for friction clutches, comprising a friction ring, a hub, a plurality of spokes connecting the hub and ring, flexible means connecting the hub ends of the spokes and the hub, and heat-insulating means interposed between the hub ends of the spokes and the hub.

22. A transmitting member for friction clutches, comprising a friction ring, a hub, and a structure consisting of a plurality of individual, substantially radial spokes connecting the hub and the ring, the hub ends of adjacent spokes engaging each other laterally in the plane of the spokes to impart lateral rigidity to said structure in said plane, said hub ends of the spokes terminating a substantial distance from the hub, and heat-insulating material between said ends and the hub.

23. A friction element for use in a clutch, comprising a hub provided with a flange, a pair of spaced washers attached to the flange, heat-insulating material between the washers and in engagement with the hub, a plurality of individual spokes secured to the washers, the ends of the spokes between the said washers bearing against the insulating material, and a friction member secured to the free ends of the spokes.

24. A transmitting member comprising a hub, a ring extending at right angles to the axis of the hub, a friction disc, a plurality of spokes connected thereto, a connection between the ring and the ends of the spokes, and a connection between said ring and the hub, said connections providing a flexible mounting for the disc on the hub.

25. A transmitting member for friction clutches comprising a ring of friction material, a hub, means for connecting the ring to the hub, and heat-insulating material in said connecting means.

26. A transmitting member for friction clutches, comprising a ring of friction material, a flexible spoked disc mounting said ring, a hub having an integral flange, and a plurality of flexible rings secured at their peripheries to the disc and hub flange.

27. A transmitting member for friction clutches, comprising a ring of friction material, a flexible spider mounting said ring, a hub having a flange, rings secured at their outer edges to opposite sides of the spider, and means securing the inner edges of said rings to the hub flange.

28. A transmitting member for friction clutches, comprising a ring of friction material, a flexible spider mounting said ring, a hub having a flange, a ring secured at its outer edge to said spider, and a collar securing the inner edge of said ring to said hub flange.

29. A transmitting member for friction clutches, comprising a ring of friction material, a hub having a flange, a disc mounting for said ring, having a central opening greater than the diameter of the flange, rings mounted in pairs on opposite sides of said disc adjacent the opening, and separate means for connecting said rings to said disc and to said flange.

30. A transmitting member for use in friction clutches which comprises a hub, a disc structure, a circumferential flange on the hub, said disc structure having an opening at least sufficient to permit the passage of the flange through it, a pair of washers one lying against each face of the disc structure adjacent said opening, said washers overlapping said flange, means connecting said washers to the disc structure beyond the outer edge of said flange, means passing through the washers and flange for connecting the washers to the flange, and a friction mat mounted on said disc structure at a distance from said hub.

31. A transmitting member for use in friction clutches which comprises a friction mat, a supporting member having spaced portions at its periphery on which said mat is mounted, a hub having a flange, said supporting member having a central opening in which the hub is mounted with the ends thereof projecting out beyond the member on opposite sides, a pair of washers, one lying against each face of the supporting member adjacent said opening, said washers overlapping said flange, means received in openings in said washers and supporting member for connecting the washers to the supporting member, said connection lying spaced outwardly beyond said flange, and means passing through the washers and flange for connecting the washers to the flange.

32. A transmitting member for use in friction clutches which comprises a friction mat, a supporting member for the mat, said member having a central opening, a hub having a flange, the overall diameter of the hub and flange being less than the diameter of the central opening in the supporting member, a pair of washers, one lying against each face of the supporting member adjacent the opening and projecting beyond the edge of the opening to overlap said flange, connecting elements passing through openings in the washers and the supporting member and lying in a circular row beyond the outer edge of the flange, and connecting elements arranged in a circular row and pasing through openings in the flange and through openings in the portions of the washers which overlap said flange.

33. In a transmitting member for use in friction clutches, the combination of a hub having a circumferential flange, a supporting member extending outward from said hub, a friction element mounted on the supporting member, at least the major portion of said element lying inward from the outer edge of said member and in contact with the opposite outer faces thereof, at least one washer overlapping the supporting member closely adjacent the outer edge of said flange and also overlapping said flange, means rigidly connecting the washer to the supporting member, said means lying beyond the outer edge of said flange, and means passing through the flange and the portion of the washer overlapping the latter for connecting the washer to the flange.

34. A transmitting member for use in friction clutches comprising the combination of a hub having a circumferential flange, a supporting member extending outward from said flange and having an outer diameter substantially the same as the overall diameter of said transmitting member, a friction element mounted on said supporting member with the major portion thereof lying inward from the outer edge of said supporting member and in contact with the opposite outer faces thereof, at least one washer overlapping the supporting member closely adjacent the outer edge of said flange and also overlapping said flange, a plurality of means rigidly connecting the washer to the supporting member, said means lying slightly beyond the outer edge of said flange, and means passing through the flange and the portion of the washer overlapping the latter for connecting the washer to the flange.

In testimony whereof I affix my signature.

ELMER V. J. TOWER.